INVENTOR.
Roy L. Huddleston

United States Patent Office 3,484,806
Patented Dec. 16, 1969

3,484,806
HYDROSTATIC EXTRUSION APPARATUS
Roy L. Huddleston, Knoxville, Tenn., assignor to the United States of America as represented by the United States Atomic Energy Commission
Filed Mar. 6, 1968, Ser. No. 710,810
Int. Cl. B21c 23/21, 31/00
U.S. Cl. 72—60                                    4 Claims

ABSTRACT OF THE DISCLOSURE

In hydrostatic extrusion operations a limitation is imposed on the pressures useable in the pressure vessel due to yield strengths of the material used in the vessel construction. Technological developments have provided structures of sufficient strength to withstand radially oriented forces greater than the yield strength of the pressure vessel material but not forces imposed upon the structure which cause the innermost cylindrical member of the pressure vessel to extrude longitudinally with respect to the pressure vessel bore. To overcome this problem a variable end loading is applied against the cylindrical member by employing a selectively loaded, differential-area piston which has the smaller-area face thereof disposed against the end of the cylindrical member.

---

The present invention relates generally to hydrostatic extrusion systems, and more particularly to such systems wherein the deleterious longitudinal extrusion of the inner walls of the pressure vessel is virtually eliminated. This invention was made in the course of, or under, a contract with the U.S. Atomic Energy Commission.

Extrusion processes have been extensively used in the manufacture of rods, wire, tubing, special shapes, etc. Of the various extrusion processes, hydrostatic extrusion has been found to be particularly useful in the manufacture of products from materials requiring relatively high deformation temperatures and pressures. Generally, the hydrostatic extrusion process involves the extrusion of a deformable material through a die of a suitable configuration by employing a pressurized liquid as the material moving means rather than a solid plunger in direct contact with the material as employed in conventional extrusion operations. The apparatus utilized for hydrostatic extrusion operations normally comprises a pressure vessel containing a cylindrical bore in which a die is rigidly disposed. A billet of the material to be extruded through the die is placed in the bore and covered with a suitable non-compressible hydraulic fluid. A plunger is then moved into the bore to stress the fluid. As the fluid pressure within the bore is increased to a sufficiently high pressure by the plunger movement, the hydrostatic forces exerted upon the billet cause it to extrude through the die. The billet can be extruded into an environment at ambient pressure or into a chamber or bore containing hydraulic fluid pressurized to a pressure less than the extrusion pressure.

In order to extrusion form some materials by using the hydrostatic extrusion principle, the pressures required for the extrusion often approach or even exceed the tensile yield strength of presently existing structural materials employed in the construction of the pressure vessels. Consequently, several shortcomings or drawbacks are encountered in designing and constructing pressure vessels for such hydrostatic extrusion operations since the pressure vessels must necessarily be capable of withstanding the often extreme structural stresses generated by the pressurized hydraulic fluid. Of these shortcomings or drawbacks, the forces exerted in a radial outward direction from the pressure vessel bore have until recently limited the pressures useable in the extrusion operation less than the yield strength of the material used in the pressure vessel construction. However, technological advances in the design of pressure vessels have been significant in that pressure vessels can now be constructed in such a manner that the pressures generated in the vessel bore can be greater than the yield strength of the materials used in the construction of the pressure vessel. Examples of these pressure vessel constructions have been described in the literature, such as in the articles by H.L.L.D. Pugh entitled "Irreversible Effects of High Pressures and Temperatures on Materials," ASTM Materials Science Series-7, ASTM Special Technical Publication No. 370, April 1965, and "The Hydrostatic Extrusion of Difficult Metals," Journal of the Institute of Metals, vol. 93, page 201, March 1965.

While pressure vessel constructions such as described in the aforementioned literature are of sufficient integrity to contain pressures exerting radially oriented stresses greater than the yield strength of the pressure vessel materials, another shortcoming or drawback in the pressure vessel construction must be overcome before such pressure vessels can be employed for extrusion operations requiring such high pressures. This problem is due to the fact that with the development of pressures within the vessel bore capable of exerting radially directed stresses exceeding the yield strength of the vessel construction material the tendency is for the vessel material to deform outwardly. However, since the pressure vessel is constructed to withstand these radially oriented stresses, the latter are redirected in a longitudinal direction, i.e., along a plane substantially parallel to the axis of the cylindrical bore, to longitudinally deform or, in effect, extrude the relatively unrestrained walls of the vessel defining the cylindrical bore. Unless a sufficient load or stress is provided against the ends of the cylindrical pressure vessel to preclude this longitudinal extrusion, there is a high probability that the pressure vessel will eventually fracture.

Previous efforts to overcome or minimize the above-mentioned drawback due to such longitudinal extrusion of the pressure vessel walls have been only partially successful. For this reason, the great majority of pressure vessels used in hydrostatic extrusion operations are designed to utilize extrusion pressures below the pressure at which longitudinal extrusion of the radially restrained pressure vessel walls will occur.

It is the aim of the present invention to obviate or substantially minimize the above and other shortcomings or drawbacks by providing a pressure vessel construction wherein a mechanism is provided for precluding the aforementioned longitudinal extrusions of the pressure vessel material. This mechanism generally comprises a differential-area piston with the smaller surface area thereof abutting against the pressure vessel end wall. A fluid from a pressurized source is selectively conveyed to act upon th larger surface area of the piston to move the piston against the end wall with a sufficient force to obviate the longitudinally oriented extrusion. The mechanical advantage gained by using the differential-area piston is particularly desirable for this application. Further, by using selectively applied forces against the movable piston, the piston-imposed stresses or end loading acting on the pressure vessel walls may be varied throughout the extrusion to prevent overstressing of the pressure vessel walls.

It is an object of the present invention to provide a new and improved hydrostatic extrusion apparatus wherein extrusions requiring stresses greater than the yield strength of the pressure vessel material may be readily accomplished.

Another object of the present invention is to provide a pressure vessel construction wherein the pressure vessel walls are restrained in the radial direction to permit internal pressures greater than the yield strength of the pressure vessel construction material and also provided with a mechanism for preventing extrusions of the pressure vessel material in directions normal to the radial direction.

A further object of the present invention is to provide a selectively movable construction which can be used in a hydrostatic extrusion pressure vessel for selectively stressing the pressure vessel walls to prevent deleterious deformation of the pressure vessel walls during extrusion operations.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figures 1, 2:
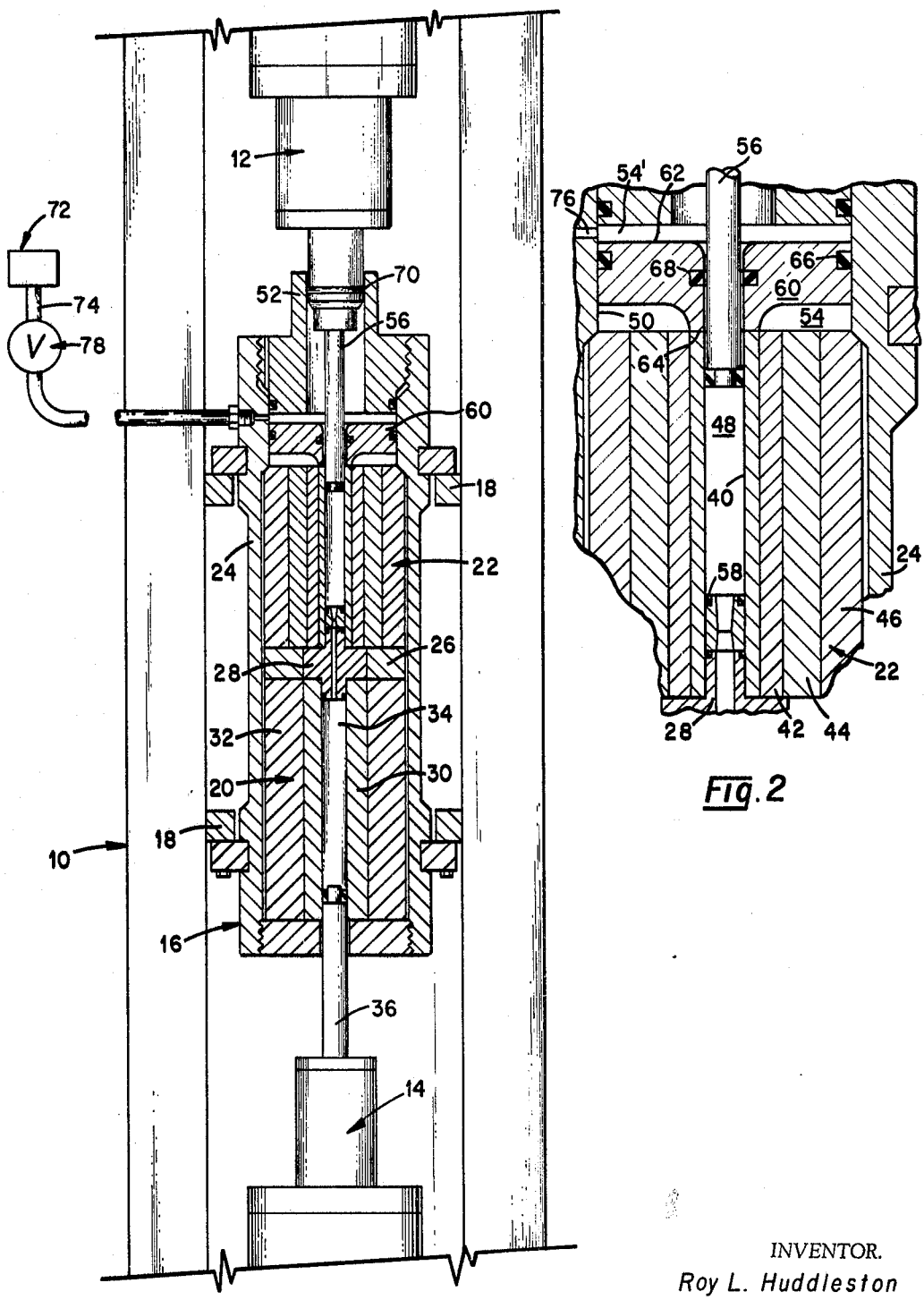
FIG. 1 is a vertically sectioned view illustrating a preferred pressure vessel construction embodying the present invention. As shown, this pressure vessel is of the type wherein the vessel is divided into chambers containing pressurized fluids at different pressures.
FIG. 2 is a fragmentary view of the embodiment illustrated in FIG. 1 showing in greater detail the differential-area piston arrangement utilized for obviating longitudinal extrusions of the pressure vessel wall.

Generally described, the present invention comprises a conventional pressure vessel construction suitable for use in hydrostatic extrusion operations. The pressure vessel is provided with a pair of cylindrical internal bores or chambers separated by a rigidly fixed extrusion die. The chambers are adapted to receive plungers from jacks normally employed in hydrostatic extrusion operations for stressing the hydraulic liquid in the chambers to selected but different pressures. In the present invention, a mechanism is employed for providing a variable end loading on the walls of the pressure vessel section under the influence of the higher working pressure. The purpose of this end loading is such that a radially restrained pressure vessel can be employed in extrusion operations requiring pressure greater than the yield strength of the metal used in the vessel construction without encountering deformation of the pressure vessel walls in a longitudinal direction. The mechanism used to provide this desirable end loading comprises an annular differential-area piston disposed about the plunger employed in the higher pressure section with the smaller piston surface resting against the radially innermost portion of the pressure vessel defining the working chamber. Upon admission of a fluid under pressure to a chamber between the larger surface of the piston and the end cap of the pressure vessel, the force exerted upon the piston by this fluid is transmitted through the piston to the smaller face thereof and is multiplied according to the relative areas of piston surfaces. Thus, the relatively small pressure exerted upon the larger piston surface is capable of applying a sufficient end loading to the cylindrical end member of the pressure vessel to prevent deformation thereof during extrusion operations employing pressures greater than the yield strength of the pressure vessel. The piston is a "free floating" piston and is provided with seals adjacent the innermost and outermost peripheries for preventing fluid passage.

With reference to the drawing, there is shown a hydrostatic extrusion apparatus embodying the present invention. This apparatus generally comprises a conventional rectangularly shaped yoke 10, a pair of hydraulic jacks 12 and 14 carried by the yoke 10 in opposing relation as shown, and a pressure vessel 16 supported in the yoke 10 by suitable mounting brackets 18 at a location intermediate the jacks 12 and 14. For descriptive purposes the hydrostatic extrusion apparatus herein described is of the type wherein the pressure vessel is divided into two high pressure sections, with the hydraulic fluid in each of these sections being separately stressed to different pressures by the plungers of jacks 12 and 14. With the billet being extruded from the higher pressure section into the lower pressure section, an arrangement is provided which has been found to be desirable when ultrahigh extrusion pressures are required. For example, with a pressure vessel embodying the present invention the extrusion pressures useable in the higher pressure section may be up to about 450,000 p.s.i. while the lower pressure section may utilize pressures of about 250,000 p.s.i. Of course, to work with these pressures the jacks 12 and 14 must necessarily be of a sufficient capacity for adequately stressing the hydraulic fluid used in the pressure vessel and also the pressure vessel must be capable of withstanding these working pressures in radially oriented directions without deleterious results.

The pressure vessel 16 is shown comprising two high pressure portions or sections 20 and 22 contained within a single cylindrical housing 24 and separated from one another at approximately the midpoint of the housing 24 by an annular ring 26 bearing against the housing and a perforated plug 28 disposed within the ring 26.

The pressure vessel section 20 is the lower pressure section and may be constructed of a pair of concentric, nested cylinders 30 and 32 disposed within the housing 24 in an abutting relationship with the ring 26 and plug 28. The cylindrically configured cavity within the innermost cylinder 30 defines the bore 34 within which hydraulic fluid is stressed to the desired pressure by the reciprocatable plunger 36 of jack 14. The cylinders 30 and 32 are secured in the housing 24 by an annular end cap or plate 38 which bears against the cylinders and is affixed to the housing in any suitable manner such as by the thread arrangement shown. The construction of the above-described pressure vessel section 20 is well known in the art and is capable of readily withstanding internal pressures of 250,000 p.s.i. when the vessel is constructed of high strength steel. However, if desired, this pressure vessel section may be formed of any suitable pressure vessel construction capable of withstanding these or other working pressures.

The pressure vessel section 22 is subjected to greater internal working pressures than section 20 and is constructed in such a manner as to withstand radially impressed forces greater than the yield strength of the structural material used in the vessel construction. For this purpose any of the known vessel constructions enjoying this property may be employed for these high pressure operations. For example, a vessel construction composed of a series of nesting, pre-stressed, concentric steel cylinders, i.e. tubulations 40, 42, 44, and 46 may be employed in hydrostatic extrusion operations wherein the internal pressure, i.e., the pressure within the elongated bore 48 defined by the cavity in the innermost cylinder 40, reaches 450,000 p.s.i. Without this special construction the vessel would fracture under the stress provided by the working pressure in a direction radially oriented with respect to the axis of the bore 48. However, even with this construction and irrespective of the thickness of the innermost cylinder 40, the internal pressures, when above the yield strength of the steel employed in the vessel construction, will cause the vessel material to extrude or deform along a plane generally parallel to the axis of bore 48. This problem is virtually eliminated by employing the present invention, as will be described in detail below. With the cylinders 40–46 in place within the housing, one end of the cylinders abut against the ring 26 and plug 28. The nested cylinders are prevented from movement in the direction away from the ring 26 by any suitable means, such as, for example, an inwardly extending shoulder 50 on the inner surface of the housing 24.

As shown, the housing 24 is provided with an annular end cap or plate 52 corresponding to end plate 38, but at a location spaced from the ends of the cylinders 40–46 so as to define a cavity or chamber 54 therebetween. The reciprocating plunger 56 of jack 12 projects through the annular end plate 52, the chamber 54, and penetrates the bore 48 so as to seal one end thereof. The opposite end of the bore 48 is provided with a conventional extrusion die 58 of any desired configuration. This die 58 rests against the plug 28, with the opening through the die being in alignment with the perforation through the plug so as to place the bores 34 and 48 in registry with one another.

In accordance with the teachings of the present invention, an annular differential-area piston 60 is placed in the chamber 54 between the ends of the cylinders 40–46 and the end plate 52, with the face or end 62 of the piston having the larger surface area being nearest the end plate 52 while the face or end 64 having the smaller surface area is disposed on the cylinder side of the chamber 54. The annular face 64 of the piston is preferably of such a size and in such a location that it bears against the full end of the innermost cylinder 40 as shown. Of course, if the cylinder 40 were of a thickness greater than that shown, the dimensions of the piston face 64 would preferably remain small so as to maintain the mechanical advantage afforded by the relative differences in the areas of the piston faces 62 and 64. In either event, the radially innermost edge of the piston face 64 is preferably oriented in the same plane as the innermost wall of the cylinder 40.

With the piston 60 in chamber 54, as shown, suitable seals such as "O" rings 66 and 68 are carried by the piston and are respectively disposed between the inner wall of the housing such as defined by the shoulder 50 and the outer surface of the piston and between the outer surface of the plunger 56 and the inner surface of the piston so as to isolate the portion of the chamber 54 between the piston face 62 and the end plate 52 and thereby define a volume 54' into which pressurized fluid may be conveyed. To assure that this volume is fluid-tight, a further seal such as "O" ring 70 may be carried by the plunger 56 in a sealing arrangement with the opening through the end plate 52.

In order to prevent deformation or extrusion of the radially restrained pressure vessel walls in a direction generally parallel to the axis of bore 48, the piston face 64 is forced against the end of the innermost cylinder 40 to provide a sufficient end loading upon the latter for obviating such extrusion of the cylinder 40. To provide this end loading, hydraulic liquid from a suitable source generally indicated at 72 is introduced into the volume 54' through a suitable conduit 74 and tap 76 in the housing 24 to act against the larger face 62 of piston 60 and thereby force the smaller face 64 of the piston against the contiguous end of cylinder 40.

A desirable feature of the present invention is the use of a selectively variable pressure within volume 54' to provide an end loading upon the cylinder 40 which can be readily controlled for any extrusion operation. To this end, with the fluid source 72 pressurized to a suitable pressure, e.g., about 4000 p.s.i., control means such as generally depicted by a valve 78 in conduit 74 may be employed to vary the pressure within volume 54' from zero to 4000 p.s.i. Thus, with a differential-area piston 60 providing a mechanical advantage of about 30 to 1, the force exerted by the piston against the end of the cylinder with the pressure of 4000 p.s.i. in volume 54' corresponds to about 120,000 p.s.i. Since the relative areas of the piston faces 62 and 64 are known, the force applied against the end of the cylinder 40 may be readily calculated so as to prevent overloading and possible deformation of the cylinder 40 or to prevent the use of an end loading which is insufficient to inhibit the aforementioned deleterious extrusion of the cylinder. In other words, as the pressure in bore 48 increases due to the movement of plunger 56 and approaches the yield strength of the cylinder 40, the pressure within volume 54' is increased to a value appropriate to restrain the cylinder 40 from longitudinal movement.

Inasmuch as the pressures within the bore 48 and the volume 54' are virtually independent of each other since each is developed from its own source, the end loading on the cylinder 40 may be developed and regulated without regard to how the pressure in bore 48 is developed. This characteristic provides for the extrusion of many different size billets at any pressure within the capability range of the extrusion system without concern as to the extrusion parameters for any given billet.

In order to provide a clearer understanding of the present invention a typical hydrostatic extrusion operation is set forth below. For the purpose of this illustration a tungsten billet is extruded by employing a hydrostatic extrusion pressure of about 400,000 p.s.i.

With the extrusion apparatus vertically oriented as shown and the piston 60, plunger 56, and end plate 52 removed from the housing, the plunger 36 is positioned in the bore 34. A tungsten billet (not shown) is inserted in bore 48 and then hydraulic oil is poured into the bores 34 and 48 from the upper end until the oil level covers the billet and is near the top of bore 48. The piston 60, end plate 52, and the plunger 56 are then positioned as shown. The plungers are then simultaneously moved farther into their respective bores to pressurize the oil. As the pressure within bore 48 increases, pressurized hydraulic oil is introduced into the volume 54' from source 72 to provide an end loading on the cylinder and, as the pressure in the bore 48 is further increased, additional oil is introduced into the volume 54' to correspondingly increase the end loading until the pressure within bore 48 is sufficient to extrude the tungsten billet. The pressure required to initiate the extrusion is usually greater than that required to maintain the extrusion after its initiation. However, the relationship of the end loading on the cylinder to the pressure within the bore 48 is dependent on several variables including the material used in the vessel construction, type of vessel construction, size of the differential-area piston, etc. Accordingly, the end loading should be pre-computed for each vessel prior to the extrusion. With a pressure vessel of the type shown and hereinabove described and having a one-inch-diameter bore 48 and a two-inch-diameter piston face 64, the end loading on the cylinder 40 should be approximately 100,000 p.s.i. when the pressure in the bore 48 reaches 450,000 p.s.i. Upon completion of the extrusion, the pressures are relieved and the extruded product removed from bore 34. Reloading another billet in the bore 48 for a second extrusion may be accomplished by simply removing the plunger 56 from the vessel.

It will be seen that the present invention sets forth a new and improved hydrostatic extrusion apparatus which is particularly suitable for extruding materials requiring extrusion pressures ranging from relatively low values upwards to values exceeding the yield strength of the materials used in the construction of the pressure vessel. Another unique characteristic provided by the variable end loading feature of the present invention is due to the fact that the excessive end loadings on the cylinders such as caused by mechanical means, e.g., contacting the cylinders 40–46 with the end plate 52, are obviated so as to prevent deleterious distortions of the cylinder walls.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

What is claimed is:

1. An apparatus for hydrostatically extruding materials, comprising a tubular pressure vessel, at least one tubulation disposed in said vessel and including an elongated passageway projecting therethrough defining a high pressure zone for receiving a billet of extrudable material and a pressurizable fluid, abutment means at one end of the tubulation for restraining axial movement of the tubulation in one direction, end cap means secured to said vessel at a location axially spaced from another end of said tubulation for defining a volume therebetween, and selectively movable means disposed within said volume and bearing against said other end of the tubulation for preventing axial movement of the tubulation in a direction opposite to said one direction.

2. The apparatus for hydrostatically extruding materials as claimed in claim 1, wherein the selectively movable means comprises a differential-area piston disposed in said volume, said piston including a first surface thereof in a contiguous relationship with said other end of the tubulation and second surface thereof disposed adjacent to said end cap means and having a larger area than said first surface, a source of pressurized fluid is in registry with the portion of said volume intermediate said second surface and said end cap means for moving said first surface of the piston against said other end of the tubulation, and wherein means selectively control the pressure of said pressurized fluid in said volume portion for varying the load applied against said tubulation by said piston.

3. The apparatus for hydrostatically extruding materials as claimed in claim 2, wherein said piston is of an annular configuration with the opening therethrough defined by the inner peripheral walls of said piston penetrating the central portions of said surfaces, and wherein the inner diameter of said piston and the diameter of said passageway through the tubulation are substantially equal and coaxial.

4. The apparatus for hydrostatically extruding materials as claimed in claim 2, wherein the load applied against said tubulation by said piston is sufficient to prevent movement of the latter in said opposite direction when the radially applied stress against said tubulation due to the pressure of the pressurizable fluid therein exceeds the yield strength of the material from which the tubulation is constructed.

References Cited

UNITED STATES PATENTS

| | | | |
|---|---|---|---|
| 3,354,685 | 11/1967 | Green | 72—253 |
| 3,364,716 | 1/1968 | Averill et al. | 72—253 |
| 3,390,563 | 7/1968 | Fuchs | 72—60 |

RICHARD J. HERBST, Primary Examiner

U.S. Cl. X.R.

72—271